United States Patent [19]

White et al.

[11] Patent Number: 4,793,133

[45] Date of Patent: Dec. 27, 1988

[54] MANUAL BACKUP FOR ELECTRONIC FUEL CONTROL

[75] Inventors: Albert H. White, Wethersfield; Robert E. Peck, Prospect, both of Conn.

[73] Assignee: Colt Industries Inc, New York, N.Y.

[21] Appl. No.: 546,567

[22] Filed: Oct. 28, 1983

[51] Int. Cl.$^4$ .................................... F02C 9/28
[52] U.S. Cl. .................................... 60/39.281
[58] Field of Search .................................... 60/39.281

[56] References Cited

U.S. PATENT DOCUMENTS

| | | | |
|---|---|---|---|
| 2,700,872 | 2/1955 | Lee | 60/39.281 |
| 3,513,899 | 5/1970 | Paduch | 60/39.281 |
| 3,782,109 | 1/1974 | Linebrink et al. | 60/39.281 |
| 3,888,078 | 6/1975 | Grevne et al. | 60/39.281 |
| 4,033,112 | 7/1977 | Schuster | 60/29.281 |
| 4,077,203 | 3/1978 | Burnell | 60/39.281 |
| 4,344,281 | 8/1982 | Schuster et al. | 60/39.281 |
| 4,368,618 | 1/1983 | Nave | 60/39.281 |

*Primary Examiner*—Louis J. Casaregola
*Attorney, Agent, or Firm*—Richard A. Dornon

[57] ABSTRACT

A manual backup system (10) for a fuel control incorporating a metering valve (108) controlled by an electronic computer has a power piston (34) and a loading piston (60) in confronting relationship adapted to engage each other upon power being withdrawn from a solenoid operated valve (72). The loading piston acts to maintain an arm (28) in engagement with the power piston so that it follows the power piston's movements as controlled by a servo valve (48), incorporating a fuel flow to compressor discharge pressure schedule (54), operated by a PLA lever (74). The position of the arm represents a requested fuel flow to discharge pressure ratio. The arm is mechanically connected to the metering valve through a multiplier linkage (96) which is also connected to a compressor discharge pressure transducer (98) so that the metering valve is positioned in accordance with the requested fuel flow to discharge pressure ratio as multiplied by the sensed compressor discharge pressure. Fuel flow is metered on the basis of an adjustable manual fuel flow to compressor discharge pressure schedule with the PLA lever operating in its normal quadrant. The PLA lever is not susceptible to being back driven during changeover or manual operation.

7 Claims, 2 Drawing Sheets

MANUAL BACKUP FOR ELECTRONIC FUEL CONTROL

TECHNICAL FIELD

This invention relates to fuel controls for gas turbine engines, and more particularly to electromechanical fuel controls.

BACKGROUND ART

Prior art fuel controls for gas turbine engines have incorporated devices to enable an operator to manually position the main fuel metering valve and/or other control elements in the event of a failure in the automatic positioning system. Examples of manual control devices for electronic fuel controls are illustrated in U.S. Pat. Nos. 3,820,323; 4,077,203; and 4,302,931. In general, existing manual control devices have not been adapted to provide a nonlinear and adjustable Wf/P (fuel flow to compressor discharge pressure) schedule nor permitted manual control of the engine with the primary pilot power lever (PLA) operating in its normal quadrant. In addition, state of the art control devices have not provided a servo system with high force levels for positioning control elements whereby the PLA lever cannot be back driven either before or during actuation of the manual control device.

DISCLOSURE OF THE INVENTION

In accordance with the invention, there is provided a manual backup system for an electromechanical fuel control which may be brought into operation by an electrical power failure, activation of a switch or other occurrence such as a computer malfunction. The system of the invention incorporates opposing hydraulic pistons which are adapted to engage and confine an arm during changeover from automatic control to manual control in such a manner as to effect a smooth control transition. Rotation of the power lever after engagement results in a powered translation of one of the pistons which is in accordance with a predetermined nonlinear schedule. The arm may be connected to a fuel metering valve or other control element via a multiplier linkage (Wf/p X P) associated with a compressor discharge pressure transducer.

A manual control system of the invention is advantageous in that it permits attainment of a nonlinear and manually adjustable Wf/P schedule and additionally allows for operation of the primary pilot power lever (PLA) in its usual quadrant. Because a system of the invention incorporates a servo system capable of providing high force levels to position control elements, the PLA lever cannot be back driven.

Accordingly, it is a primary object of the invention to provide a manual backup system in an electromechanical fuel control capable of providing a nonlinear and manually adjustable Wf/P schedule.

Another object of the invention is to provide a manual backup system in an electromechanical fuel control in which the PLA lever may operate in its normal quadrant and is not susceptible to being back driven.

These and other objects and advantages of the invention will become more readily apparent from the following detailed description when taken in conjunction with the accompanying drawings in which:

BEST MODE OF CARRYING OUT INVENTION

Figure 1:
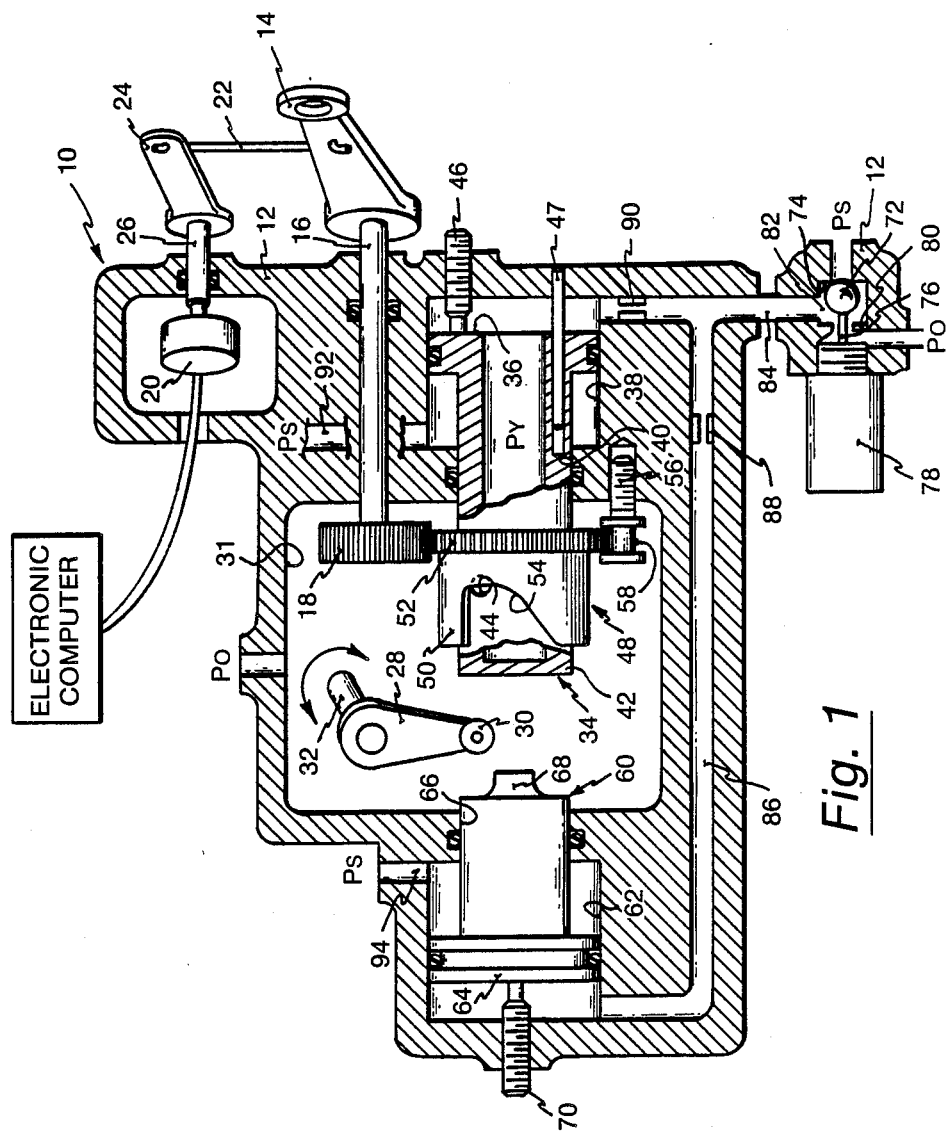
FIG. 1 is a schematic diagram of a computer to manual changeover system according to the invention.

Referring to FIG. 1, there is shown generally at 10 a manual backup system of the invention suitable for incorporation in an electromechanical fuel control. Such a fuel control typically includes an electronic computer (not shown) which senses various engine parameters and a plural cavity housing where the hydromechanical elements of the control are located such as the metering valve, head regulator (not shown), and pressurizing valve (not shown). In FIG. 1, the housing 12 of the depicted manual backup system would preferably constitute a portion of the control's plural cavity housing.

A speed setting or power lever (PLA) 14 has a rotatable shaft 16 attached thereto mounted in the housing 12 and carrying a gear 18 at its opposite end. Power lever 14 is also connected to a position transducer 20 (such as potentiometer) through a mechanism comprised of a link 22, arm 24 and rotatable shaft 26 mounted in the housing 12. The position transducer 20 generates a set or requested speed signal to the computer.

Figure 2:
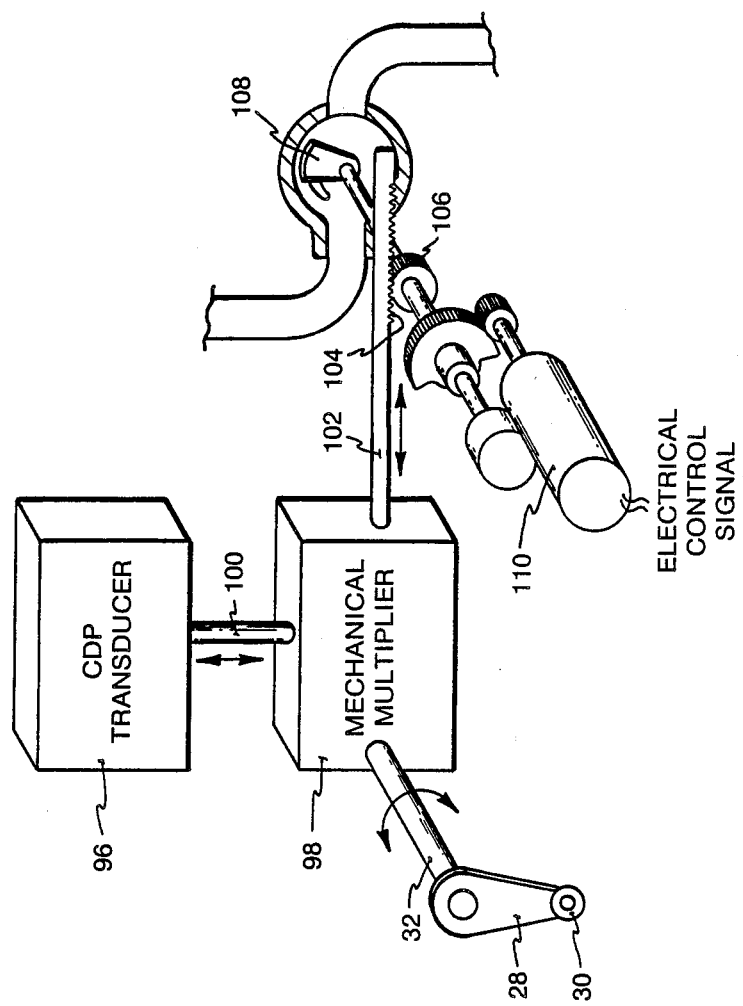
FIG. 2 is a schematic representation of the relationship between the request arm, the multiplier linkage, the compressor discharge pressure transducer and the metering valve.

An arm 28 having a rounded end 30 is disposed within a cavity 31 in the housing 12 and fixedly mounted upon a shaft 32 for rotation therewith. The rounded end 30 may be constituted by a ball bearing. Shaft 32 is mounted for rotation in the housing 12 and is connected to other elements of the manual back-up system as shown in FIG. 2. Suffice it to say that, for purposes of describing FIG. 1, the angular position of the arm 28 indicates a requested Wf/p.

A hollow power piston, generally indicated at 34, is mounted in the housing 12 for axial sliding movement therein. The base 36 of the power piston is of an enlarged diameter and has its outer periphery in sliding contact with the walls of a cylindrical cavity 38. The outer surface of the intermediate portion of the power piston 34 is in sliding engagement with a cylindrical wall portion 40 of the housing 12 interposed between cavities 31 and 38. The power piston extends into the cavity 31 and has a face 42 which serves to isolate its hollow interior from the pressure therein and is adapted to contact the rounded end 30 of the arm 28 for setting a requested Wf/P. The power piston 34 has a bleed hole 44 extending through the wall thereof at a location spaced from the face 42. Bleed hole 44 functions to establish fluid communication between the interior hollow portion of the piston 34 and the cavity 31. A power piston stop 46 engages the base 36 of the power piston 34 during normal control operation and is held thereagainst by the pressure forces acting upon the power piston. An antirotation pin 47 extending from the housing into a bore in the piston base prevents piston rotation.

Mounted upon the power piston 34 in coaxial relationship therewith for rotation thereover is a rotary servo valve generally indicated at 48. Rotary servo valve 48 is a short cylindrical tube 50 which carries a gear 52 in meshing engagement with the gear 18 and has a portion of its wall cut away to define a Wf/p scheduling surface 54. During changeover and manual operation the power piston 34 is adapted to move to a position where the scheduling surface uncovers a portion of the bleed hole 44 such that the piston pressure forces are in equilibrium and power piston motion will terminate in the manner of a position follower servo system. Axial movement of the servo valve 48 is prevented by a datum adjustment screw 56 in threaded engagement with housing 12 which has a groove 58 at its end for receiving the periphery of the gear 52. It should be apparent that the position of the datum adjustment screw 56 with respect to housing 12 will dictate the particular Wf/p for a given throttle position during manual operation.

A loading piston, generally shown at 60, is adapted to advance toward the power piston 34 during changeover from automatic to manual operation so as to gently confine the rounded end 30 of the arm 28 between the respective opposing faces of the confronting pistons. The loading piston 60 is mounted in a cavity 62 in the housing 12 for axial sliding movement therein. The base 64 of the loading piston 60 is of an enlarged diameter and has its outer periphery in sliding engagement with the wall of the cavity 62. The intermediate portion of the piston has its outer surface in sliding engagement with a cylindrical wall 66 of the housing 12 which is disposed between the cavities 31 and 62. The face of the piston has a projection 68 thereupon which is of such a length that the respective faces of the pistons 34 and 60 barely touch the rounded end 30 when the projection 68 contacts the face of the piston 34. It will be appreciated that such an arrangement will prevent damage to the rounded en 30 during engagement of the pistons. An adjustable stop 70 screwed into the housing 12 engages the base of the piston 60 for defining a leftward limit of travel which is the at rest position of loading piston 60 during normal fuel control operation.

A ball valve 72 functions to supply the power piston 34 and the loading piston 60 with the pressure necessary for operation in the manual mode. The ball valve 72 is shown in its normal position in seated engagement with a seat 74 which defines an inlet port communicating with a high pressure source Ps. The ball valve 72 is maintained in such seated engagement by the plunger 76 of an energized solenoid 78 which is screwed into the housing 12. Ball valve 72, upon deenergization of the solenoid 78, will be forced by the pressure Ps to seat against another inlet port 80 which communicates with a low pressure source as the plunger 76 is displaced to the left by its spring preload. Hence, the chamber 82 in which the ball valve 72 is located is exposed to either low pressure or high pressure in accordance with the state of energization of the solenoid 78.

The chamber 82 is placed in fluid communication with the cavities at respective locations behind the bases of the pistons 34 and 60 by means of conduits 84 and 86, respectively. Conduit 86 incorporates a restriction or orifice 88 and conduit 84 embodies a restriction or orifice 90. The annular volumes defined by cavities 38 and 62 surrounding the respective pistons 34 and 60 are referenced to the pressure Ps of the high pressure source via conduits 92 and 94. The cavity 31 is exposed to the pressure Po of the low pressure source. It will be appreciated that the high pressure source may be fuel discharged by the pump upstream of the metering valve and that the low pressure source may be boost pressure.

FIG. 2 shows the relationship between the arm and shaft assembly of FIG. 1 to a main fuel metering valve.

As depicted in FIG. 2, the shaft 32 is connected to a mechanical multiplier linkage 96 which is also connected to a compressor discharge pressure transducer 98 having a shaft 100 which translates in response to changes in compressor discharge pressure. Such multiplier linkages and pressure transducers are old and well-known known devices and a description of their detailed construction is not essential to an understanding of the present invention nor to its implementation and is omitted herefrom. The multiplier linkage 96 has an output shaft 102, the movement of which represents Wf/p x P or Wf wherein Wf is requested fuel flow and P is compressor discharge pressure. The output shaft carries teeth 104 which mesh with the teeth of a gear 106 carried by a shaft which turns a rotating plate type metering valve 108. Under normal conditions the metering valve is positioned by a computer controlled stepper motor 110.

In the normal or automatic mode of control, with the computer driving the metering valve 108, the elements of the manual back-up system will generally be positioned as depicted in FIG. 1. In this condition, the solenoid 78 is energized whereby the pressure Py behind and in the interior of the power piston 34 is equal to Po, the pressure of the low pressure source. Similarly, the pressure behind the loading piston 60 is Po. The pressure Ps, the pressure of the high pressure source, acts on bases 36 and 64 of the power piston 34 and the loading piston 60, respectively to maintain them in engagement with their stops 46 and 70 in their at rest or normal positions. Rotation of the PLA lever 14 results in the position transducer generating a signal to the computer indicative of a demanded speed, thrust, horsepower, or other quantity. During this lever movement, the servo valve 48 rotates over the power piston 34 but, of course, produces no axial movement thereof because no motive pressure differentials are engendered by such rotation. By virtue of the mechanical connection between the shaft 32, the metering valve 108, and transducer 98 the arm 28 freely moves in accordance with the Wf/p set by the control when operating in the automatic mode. It will be appreciated that by proper adjustment of the stops 46 and 70, permissible maximum and minimum mechanical Wf/p limits may, if desired, be imposed upon the fuel control during automatic operation. Assuming, for example, that delivery of power to the computer is interrupted, the normally energized solenoid 7 becomes deenergized, thereby causing the plunger 76 to withdraw from the ball valve 72 under the influence of its spring preload. Withdrawal of the plunger 76 results in the ball valve 72 becoming seated against the inlet port 80 whereby the conduits 84 and 86 are exposed to the high pressure Ps.

With the chamber 82 subjected to the pressure Ps, the power piston 34 and the loading piston 60 slew inwardly at respective velocities determined by the sizing of the restrictions 90 and 88. The pressure Py in the interior and in back of power piston 34 assumes an intermediate value between Ps and Po as the power piston continues its slewing motion. Similarly, the pressure behind the loading piston assumes an intermediate value between Ps and Po as the loading piston 60 undergoes its slewing motion. When the bleed hole 44 reaches the scheduling surface, the intermediate pressure in the interior and in back of the power piston begins to drop; and as the bleed hole 44 is further uncovered, the pressure Py continues to drop until all pressure forces acting on the power piston 34 are in equilibrium whereby motion of the power piston 34 terminates. Subsequently, motion of the loading piston 60 terminates when the projection 68 contacts the wall 42 of the power piston 34, thereby trapping the rounded end 30 between the faces o the pistons 34 and 60.

During changeover and manual operation, the pressure Py may be regarded as a variable control pressure produced between two restrictions, viz.: restrictions 90 and 44, the latter of which is of a variable area. This control pressure functions to cause a translation of the piston to a position in which equilibrium is attained in the manner of a position follower servo system. It will be understood that the exact position which the power piston 34 assumes when the pressure forces are in equilibrium is solely a function of the position of the PLA lever 14 a the time of changeover.

Restrictions 88 and 90 are sized to provide a smooth and controlled transition to the manual Wf/p. In this regard, it should be noted that the slewing velocity of the loading piston (as dictated by restriction 88) is such that the power piston 34 always attains its scheduled position before the loading piston 60 engages the rounded end 30. Such delayed engagement forestalls the occurrence of any undesirable transients during changeover. Simply stated, it should never be possible to have the arm 28 driven counterclockwise by the loading piston and then driven clockwise by the power piston during changeover.

After engagement of the projection 68 with the wall 42 of the power piston 34, which traps the rounded end 30 between the pistons, changeover is completed. Movement of the PLA lever and consequential rotation of the servo valve 48 produces displacement of the power piston which results in rotation of the arm 28. The constant urging force of the loading piston 60 against the power piston 34 is small in comparison to the forces which displace the power piston whereby it has only a moderate impact on its slewing velocity and does not significantly alter the equilibrium position of the power pistons.

The rotation of the shaft 32 produces a movement of the metering valve 108 through the multiplier linkage 96. The stepper motor is, of course, unpowered during manual control and is backdriven by the manual system. It will be noted that, for similar PLA lever demands, the above described system permits the PLA lever 14 to be moved in the same quadrant in the manual mode as in the automatic mode thereby contributing to pilot convenience. It is also noteworthy that the total range of authority while in the manual control mode, can be adjusted to provide engine protection over any part of the engine operating envelope. In addition, the PLA lever 14 could be designed for an overtravel range after engaging a detent whereby maximum engine performance could be realized.

Obviously, many modifications and variations are possible in light of the above teachings without departing from the scope or spirit of the invention as defined in the appended claims.

What is claimed is:

1. In an engine fuel control for a gas turbine engine, which control is of the type having: a housing, a metering valve in the housing for controlling fuel flow to the engine, a motor operatively connected to the metering valve for positioning the metering valve, an electronic computer for sensing various engine parameters and controlling the motor and a lever member for generating a signal to the computer indicative of a demanded quantity, a manual backup system comprising:
    means responsive to movements of the lever member for setting a requested fuel flow to compressor discharge pressure ratio as a function of the position of the lever member;
    transducer means for sensing compressor discharge pressure;
    multiplier means for multiplying the set fuel flow to compressor discharge pressure ratio and the sensed compressor discharge pressure to obtain an output representative of requested fuel flow; and
    means responsive to the output of the multiplier means for positioning the metering valve.

2. The manual backup system of claim 1, further including:
    valve means to render operative the lever member movements responsive means.

3. The manual backup system of claim 1, wherein the motor is a stepper motor and wherein the metering valve is of the rotating plate type.

4. In an engine fuel control for a gas turbine engine of the type having: a housing, an electronically controlled metering valve in the housing for controlling fuel flow to the engine; a lever member for electronically setting a requested speed; a manual backup system comprising:
    a power piston mounted in the housing for axial sliding movement therein;
    a loading piston mounted in the housing in normally spaced confronting relationship to the power piston for axial sliding movement therein;
    a changeover valve mounted in the housing to effect changeover from automatic to manual fuel control operation for directing a selected pressure to the pistons for causing the pistons to slew toward one another into operative engagement;
    an arm mounted in the housing adjacent the pistons and operatively connected to the metering valve, the arm being confined between the pistons when in operative engagement such that movement of the power piston produces a corresponding movement of the arm; and
    a servo valve mounted in the housing and operatively connected to the lever member for moving the power piston to various positions in accordance with movement of the lever member such that the axial position of the power piston is a scheduled function of the lever position.

5. The manual backup system of claim 1, further including:
    first and second conduits respectively connected to the changeover valve and positioned in the housing to respectively direct pressure to the power piston and the loading piston;
    first and second restrictions in the first and second conduits, respectively, for controlling the slewing velocities of the pistons during and after changeover from automatic operation to manual operation.

6. The manual backup system of claim 5, wherein the power piston has a hollow interior portion subjected to the pressure directed thereto and wherein the piston has a bleed hole extending through the wall thereof for establishing restricted fluid communication between the interior of the piston and the exterior o the piston which is at a lower pressure and wherein the servo valve comprises:

a rotary valve mounted for rotation upon the power piston, the rotary valve having a scheduling surface thereupon adapted to partially cover the bleed hole when the piston is in an equilibrium position during manual operation; and a gear carried by the rotary valve for rotating the rotary valve in response to movements of the lever member.

7. The manual backup system of claim 1, further including:

a rotatable shaft mounted for rotation in the housing, the arm being fixedly connected to the shaft for rotation therewith;

a mechanical multiplier having an output shaft connected to the rotatable shaft;

gear means to connect the output shaft to the metering valve;

a transducer for sensing compressor discharge pressure; and means to connect the mechanical multiplier to the transducer.

* * * * *